Patented June 7, 1927.

1,631,830

UNITED STATES PATENT OFFICE.

LAUREL A. NEGLY AND PERCY S. BLACK, OF FORT WORTH, TEXAS.

PREPARING CEREAL-BEVERAGE COMPOUNDS.

No Drawing.   Application filed November 6, 1926.   Serial No. 146,580.

Our invention relates to a process of preparing a novel composition of matter and more particularly to a cereal beverage compound and a flavoring extract in the form of a syrup.

It is an object of the present invention to produce a cereal beverage compound and a flavoring extract possessing the aroma, and other pleasing characteristics of coffee but which is free of injurious and disagreeable ingredients such as the caffeine contained in coffee.

It is a further object of our invention to produce a syrupy flavoring extract which may be readily diluted with water, either hot or cold, to instantly form a beverage having a characteristic coffee taste and which possesses healthful and nutritious qualities.

Another object of our invention resides in the production of a syrup which may be used undiluted or in admixture with sweetening syrups as a flavoring for ice cream, confectionery, cake, and food products in general to impart thereto a pleasing coffee taste.

It is a further object of our invention to provide a process for preparing a cereal beverage compound and a flavoring syrup or extract containing healthful and nutritious ingredients and having a taste strongly resembling that of coffee.

Our improved composition is made essentially of roasted cereal and roasted peanuts, the latter counteracting the grainy or bitter taste due to the cereal and imparting to the product a pleasing coffee taste and aroma, together with other ingredients hereinafter set forth in detail for improving the taste and adding healthful and nutritious properties. As the cereal we preferably employ a mixture of whole roasted wheat and whole roasted rye in equal proportions although it is to be understood that the invention is not limited thereto. If desired, a small amount of whole roasted barley may be added to the cereal mixture for the purpose of strengthening the taste of the ultimate product. Likewise chicory may be employed in the preparation of our improved extract to add to or strengthen the coffee taste thereof.

To improve the taste and to impart healthful and nutritious qualities to our novel product we usually include therein ground raisins, ground figs, malt syrup or any other syrup, and wheat bran, the bran also serving an additional purpose in the process of manufacture referred to hereinafter. Sweetening agents such as brown sugar and honey may also be employed in the preparation of our syrup. A small proportion of licorice is preferably included for the purpose of removing or counteracting any bitterness which may be due to the presence of the grains.

In our copending application number 146,282, filed November 4, 1926, we have disclosed and claimed an improved solid cereal beverage compound consisting in its preferred form of the following ingredients in the proportions stated:

|  | Ounces. |
|---|---|
| Whole roasted wheat | 2 |
| Whole roasted rye | 2 |
| Whole roasted barley | 1/6 |
| Whole roasted peanuts | 1/2 |
| Chicory | 1½ |
| Wheat bran | 4 |
| Brown sugar | 1 |
| Honey | 1/2 |
| Malt syrup | 1/4 |
| Ground raisins | 1/2 |
| Ground figs | 1/4 |
| Licorice | 1/16 |
| Water | 3 |

The flavoring extract prepared according to the process of the present invention, in its preferred form, consists of a syrup manufactured from the above mentioned ingredients in the amounts stated although it is to be understood that the invention is not limited thereto as certain of the substances may be omitted and the proportions varied. However, we have found that a syrup formed from the above substances in the proportions given yields the best flavoring extract falling within the scope of our invention.

For the preparation of our preferred flavoring extract or syrup we proceed as follows:

Whole wheat, rye, barley, and peanuts are each roasted separately at a sufficient temperature and for a sufficient time to bring the grains to a uniform dark rich brownish color and are then ground or cut into pieces and thoroughly mixed in the proportions stated. Raisins and figs ground into fine particles are then added to water, brown sugar, honey, and malt syrup, if all these materials are to be included in the composition, and the mixture boiled until a solution or homogeneous liquid mass is obtained. Licorice is then added to the resultant liquid. The liquid is now mixed with bran, the bran acting as a filler and absorbent for the liquid ingredients as well as imparting healthful properies to the ultimate product. The bran with its absorbed liquid is now roasted at a temperature and for a time sufficient to produce a dark rich brown colored mass which is then thoroughly agitated in any suitable manner with the roasted wheat, rye, barley, peanuts, and chicory to produce a homogeneous mixture of a granular nature. This mixture forms the subject matter of our application above referred to and when employed in the manner therein described furnishes a healthful and nutritious cereal beverage resembling coffee in taste, aroma, and appearance.

The product obtained in the manner above set forth may be boiled down with water to convert the same to a syrup. The boiling may be effected in any suitable manner but preferably in successive stages or in receptacles arranged in series, the liquid mass being strained between the stages for removal of suspended particles. Suitable reagents may be added to the boiling body to prevent fermentation and to effect preservation. Such reagents are well known in the art. The boiling down with water is continued until a syrup of any desired consistency is obtained. Usually we boil until a fluid, almost black, homogeneous liquid having a slightly bitter coffee taste is obtained, the syrup being of such concentration that a teaspoonful diluted with a cup of water will yield a beverage similar to coffee as usually consumed.

The syrup obtained as above furnishes an excellent flavoring extract which, when suitably diluted with water or milk, either hot or cold, instantly forms a pleasant beverage, boiling being unnecessary. The beverage is healthful and nutritious and possesses the pleasant taste and aroma of coffee. The syrup, preferably diluted with sweetening syrups such as simple sugar syrup, may be used as a flavoring in the manufacture of ice cream or it may be dispensed at soda fountains in the preparation of sundaes or for making instantaneous drinks or it may find general application in the flavoring of food products to impart thereto a taste resembling that of coffee.

The product obtained by roasting the wheat bran and boiled mixture of brown sugar, honey, malt syrup, ground raisins, ground figs, and water together with the added licorice also furnishes a suitable starting material for a flavoring extract. This product is boiled down with water in a manner as described above to a syrupy consistency. This syrup has a sweet and mild coffee taste which also may be employed as a basis for instantaneous beverages or as a flavoring extract. This product, however, does not possess a strong coffee taste and aroma due to the absence of the wheat, rye, barley, chicory and peanuts.

It will be apparent that various changes and modifications may be made in the product and process herein disclosed without departing from the spirit or scope of the invention as defined in the appended claims.

Having described our invention, what we claim and desire to secure by Letters Patent of the United States is:

1. A process of preparing a cereal beverage compound which comprises boiling a mixture of brown sugar, honey, raisins, figs, and water, mixing the resultant mass with wheat bran, and then roasting the same, and mixing the roast with whole roasted cereal and roasted peanuts.

2. A process of preparing a cereal beverage compound which comprises boiling a mixture of brown sugar, honey, malt syrup, ground raisins, ground figs, and water, adding licorice to the resultant mass, mixing the same with wheat bran, and roasting, and mixing the roast with whole roasted wheat, whole roasted rye, and roasted peanuts.

3. A process of preparing a flavoring extract which comprises boiling a mixture of brown sugar, honey, raisins, figs, and water, mixing the resultant mass with wheat bran and then roasting the same, mixing the roast with whole roasted cereal and roasted peanuts, and boiling the resultant mixture in water until a syrupy liquid is obtained.

4. A process of preparing a flavoring extract which comprises boiling a mixture of brown sugar, honey, malt syrup, ground raisins, ground figs, and water, adding licorice to the resultant mass, mixing the same with wheat bran and roasting, mixing the roast with whole roasted wheat, whole roasted rye, whole roasted barley, and roasted peanuts, and boiling the resultant mixture in water until a syrupy liquid is obtained.

In testimony whereof we affix our signatures.

LAUREL A. NEGLY.
PERCY S. BLACK.